March 23, 1971  J. S. MacDONALD  3,572,182
CUTTING TOOLS

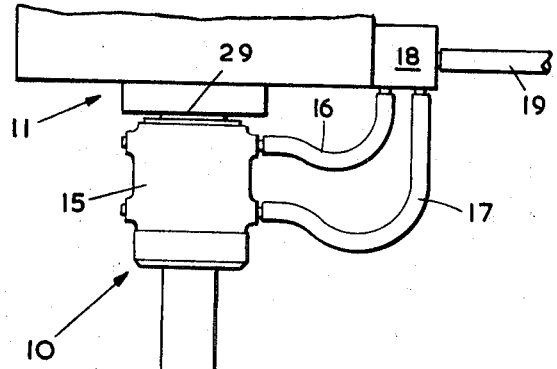
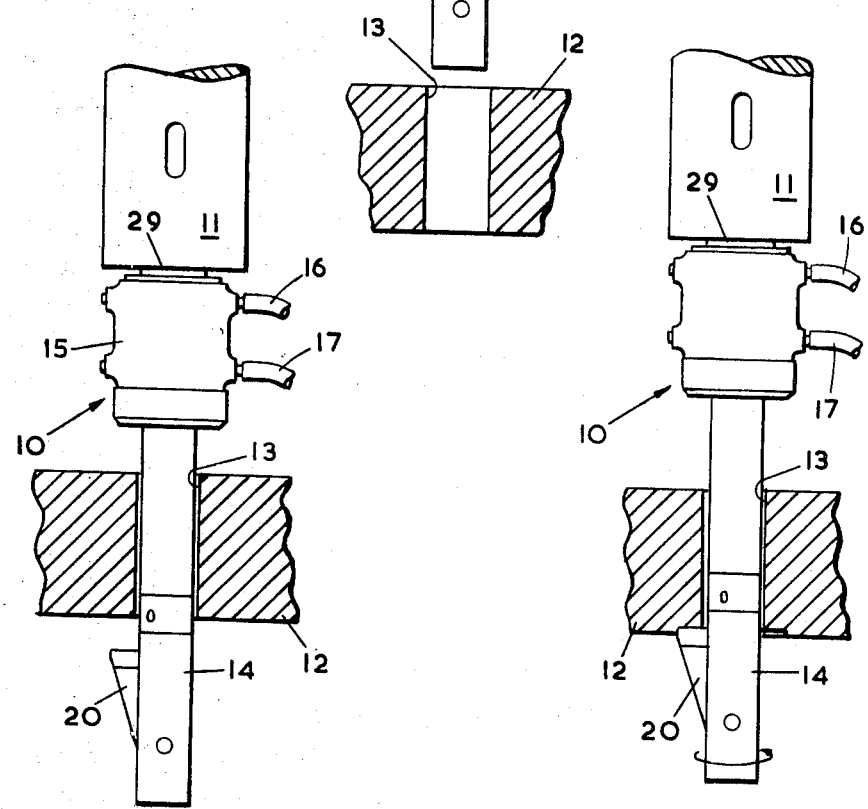
FIG.1
FIG.2
FIG.3

Filed Sept. 3, 1968  4 Sheets-Sheet 2

March 23, 1971   J. S. MacDONALD   3,572,182
CUTTING TOOLS
Filed Sept. 3, 1968   4 Sheets-Sheet 3

United States Patent Office 3,572,182
Patented Mar. 23, 1971

3,572,182
CUTTING TOOLS
James Stewart MacDonald, Rugby, England, assignor to The English Electric Company Limited, London, England
Filed Sept. 3, 1968, Ser. No. 756,858
Claims priority, application Great Britain, Sept. 1, 1967, 40,015/67
Int. Cl. B23b *29/03*
U.S. Cl. 77—73.5
8 Claims

ABSTRACT OF THE DISCLOSURE

A simple back-spot facing tool has a fluid-pressure operated actuating member which retracts the cutter into the tool body and moves it into its angle cutting position, the thrust during cutting being transferred to the tool body through the actuating member.

---

This invention relates to cutting tools for use in a machine tool, for rotary cutting operations on the back face of a workpiece. Such cutting tools may for example be used for back spot facing or chamfering, and are arranged to pass through an opening, such as a hole, previously formed in the workpiece.

Cutting operations on the back face of a workpiece can be done by passing a boring bar through the hole in the workpiece, manually fitting a tool-bit in the bar, and then carrying out the cutting operation. This is very inconvenient, especially if the machine tool is arranged for automatic operation, since it may involve stopping the automatic process temporarily, to set the tool and later to remove it. Thus a tool is required which is automatic in the sense that it can be set relative to the workpiece, operated and then removed, all by automatic remote control.

Some types of back spot facing tool are known which are automatic in this sense. In these types, the cutting bit cuts while being traversed radially outwards relative to a boring head, either linearly or by eccentric rotation. The bit must have a shank extending through the hole and slender enough to allow for this motion. The shank cannot in fact be thicker than the diameter of the hole less the required radial travel. Such tools are suitable only for faces of comparatively small diameter at the back of comparatively short holes.

According to the present invention, a cutting tool, for rotary cutting operations on the back face of a workpiece, includes a tool body long enough to pass through an aperture in the workpiece, a cutter pivoted at one end of the body on a transverse axis, means for mounting the tool in a rotary machine tool at the other end of the body, and a fluid-pressure operated actuating member in the body engaging the cutter and movable between a first position in which the cutter is retracted into the body and a fixed second position in which the actuating member holds the cutter extended laterally from the body for cutting the workpiece.

According to a preferred feature of the invention, the actuating member is a longitudinally extending bar having first cutter-engaging means engaging a cam surface of the cutter for moving it between said first and second positions, and second cutter-engaging means positioned so as to engage the cutter in said second position whereby to transmit cutting forces between the tool body and the cutter through the bar.

According to another preferred feature of the invention, the cutter has a tapered side surface, and a corresponding tapered surface being formed internally of the body and positioned so that when the cutter is in said second position it is wedged in position by mutual engagement of the said tapered surfaces.

The actuating member is preferably coupled to a piston arranged for longitudinal movement in a cylinder, arranged at the end of the body remote from the cutter, in response to fluid pressure in the cylinder.

Preferably, the actuating member is attached directly to the piston; and where the actuating member is a bar extending longitudinally of the body, it is preferably offset from the axis of the piston.

Tools according to the invention can be used in any machine tool in which the tool can be rotated and at the same time moved axially, and in any attitude, e.g. horizontally or vertically. They can readily be arranged for automatic operation, the rotation and axial movement being controlled, together with suitable arrangements for controlling the fluid pressure which works the actuating means, by a suitable automatic tool control system, for example a numerical control system.

Tools according to the invention are suitable for relatively long holes, and, when back spot facing, may be designed to operate to a face diameter more than twice that of the hole, irrespective of the length of the hole.

Cutting tools according to the invention will now be described by way of example and with reference to the accompanying drawings, of which:

FIG. 1 is a view showing the tool in a machine tool, ready for bringing on to a workpiece;

FIG. 2 shows it inserted through a hole in the workpiece, ready to be brought into cutting engagement therewith;

FIG. 3 shows the tool, doing a cutting operation;

Figure 4:
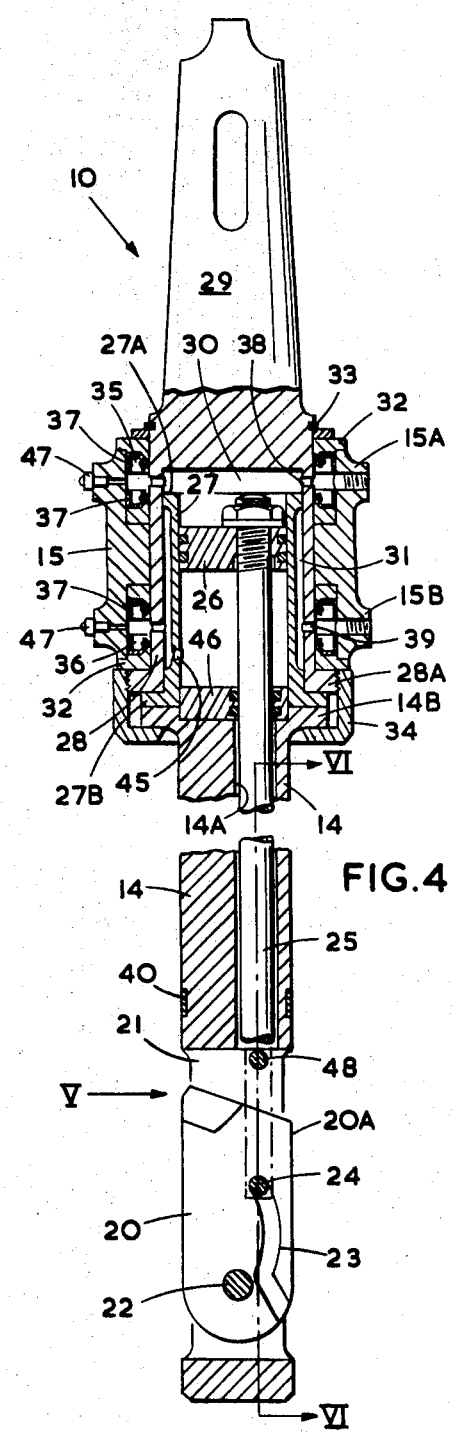
FIG. 4 is a part-sectional elevation of the tool in a preferred form, taken mainly on the line IV—IV in FIGS. 5 and 6, with the cutter retracted into the tool as in FIG. 1.
Figure 5:
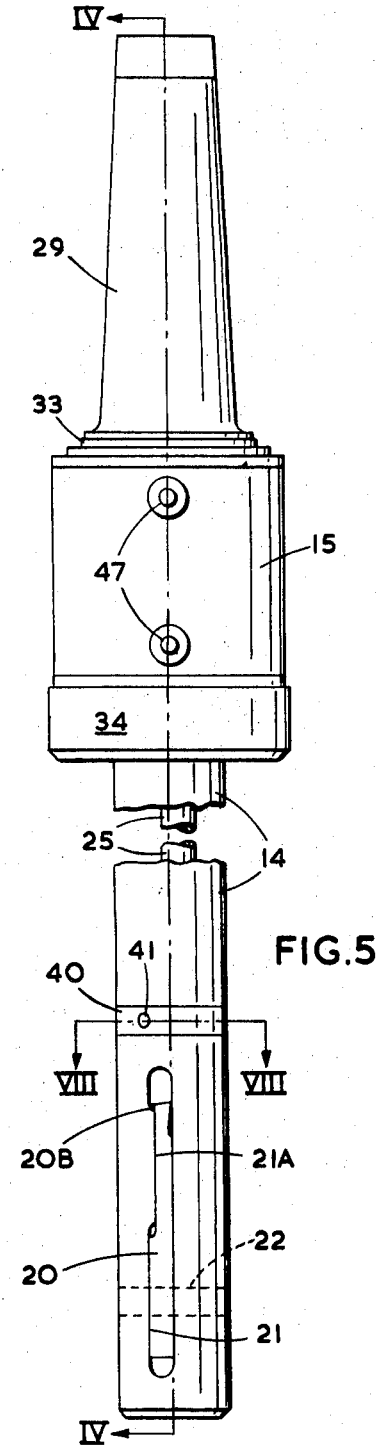
FIG. 5 is an outside view in the direction of the arrow V in FIG. 4.
Figure 6:
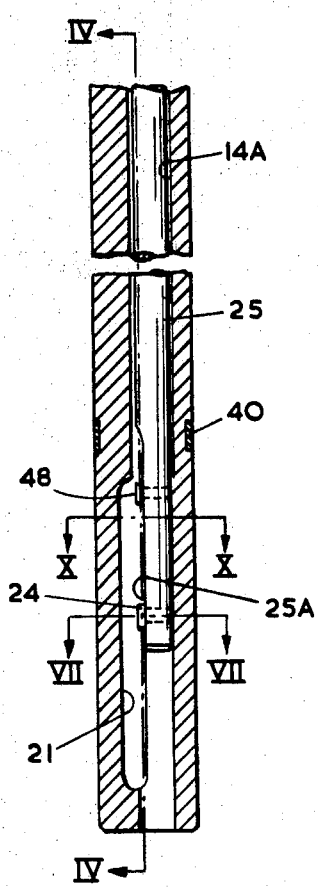
FIG. 6 is a part-sectional view of the lower part of the same tool with the cutter absent, taken on the line VI—VI in FIG. 4.
Figure 7:
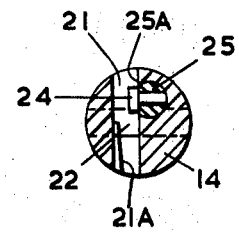
FIG. 7 is a sectional view taken on the line VII—VII in FIG. 6.

With reference to FIG. 1, the tool to be described is a back spot facing tool 10, shown mounted in the usual way in the head 11 of a vertical drilling machine. A workpiece, comprising in this case a thick flat plate 12 in which a hole 13 has been drilled, is mounted in the usual way below the head 11, in the position in which it was for the hole 13 to be drilled.

The tool 10 will be described in more detail shortly, but it comprises essentially a cylindrical tool body 14 of a diameter slightly less than that of the hole 13 and having a hydraulic cylinder at its upper end, the cylinder being rotatably arranged within a non-rotating connector 15 which is connected through flexible tubes 16, 17 to a change-over type control valve 18 mounted on the machine head 11. The valve 18 is supplied with compressed air through a pipe 19, from a source which is not shown. The tool body 14 is rotatable with the hydraulic cylinder.

Near the lower end of the tool body 14 is a retractable cutter 20, shown extended in its working position in FIGS. 2 and 3, but retracted (and therefore not visible) in FIG. 1. The tool is arranged so that on operation of the control valve 18 to admit compressed air through the lower tube 17 to the cylinder, the cutter 20 is retracted into the tool body. To move the cutter to its extended position, the valve 18 is adjusted so that the cylinder is supplied with compressed air through the upper tube 16.

In operation, the tool 10 is lowered through the hole 13 until the cutter 20 is clear of the back face of the workpiece 12, and the valve 18 is operated to move the cutter 20 to its working position. The tool is then rotated and slowly raised at the same time, until the cutting edge of the cutter engages the workpiece: further rotation, with appropriate upward movement, causes the cutter to cut the back of the workpiece around the hole 13, as shown in FIG. 3. When this "spot-facing" operation is completed, the tool can be lowered, the cutter 20 retracted and the tool withdrawn up through the hole 13.

The tool 10 itself, and the means by which the cutter 20 is moved to and from its working position and supported therein, will now be described in detail with reference to FIGS. 4 to 10.

With reference now to FIGS. 4 to 7, which show the cutter 20 retracted into the tool body 14, the tool body 14 comprises a cylindrical bar having a transverse slot 21 near its lower end, the cutter 20 being pivoted on a transverse pin 22 within the slot 21. The cutter 20 has a cam groove 23 engaging a pin 24 which is mounted on a flat face 25A formed on a cylindrical bar 25. The bar 25 is movable longitudinally in a hole 14A extending along most of the length of the body 14 parallel to, but offset from, the axis of the latter.

In the interests of simplification of the drawings, the hole 14A and bar 25 have been shown sectioned on a diametral plane, though, as can be seen from the other figures, they are in fact offset.

The top end of the bar 25 is secured to a piston 26 and a cylinder 27 which lies at one end against a flange 14B formed on the end of the tool body 14. The other end of the cylinder 27 is open and has a circumferential flange 27A fitting within a hollow cylindrical extension 28 of a conventional shank 29 by which the tool 10 can be mounted in a machine tool. The flange 27A divides the space 30 within the extension 28, communicating with the interior of the cylinder 27, from an annular space 31, also within the extension 28 but surrounding the cylinder 27.

The connector 15 consists of a cylindrical member which is trapped coaxially between two fixed end rings 32 for coaxial rotation around the extension 28. The upper end ring 32 is secured around the extension 28 by a circlip 33. The lower end ring 32 is trapped between the connector 15 and a coaxial flange 28A at the lower end of the extension 28, the flange 28A being secured against a lower flange 27B of the cylinder 27, so as to hold the latter firmly down against the flange 14B of the body 14, by means of a nut 34. The end rings 32 are made such that the connector 15 can rotate easily between them.

The connector 15 has two connecting pieces 15A, 15Z for connection to the tubes 16 and 17 respectively, shown in FIGS. 1 to 3. The connecting pieces 15A and 15B communicate through annular spaces 35 and 36 respectively, between the connector 15 and extension 28. The annular spaces 35, 36 are fitted with dynamic seal rings 57 to eliminate leakage of fluid. The upper annular space 35 communicates with the space 30, and thus with the upper side of the piston 26, through ports 38 in the extension 28. The lower annular space 36 communicates with the lower side of the piston 26 through further ports 39 in the extension 28, and thence through the annular space 31 and a port 45 in the cylinder 27.

A gland 46 is provided through which the bar 25 extends between the cylinder 27 and tool body 14.

Lubricating nipples 47 may be provided on the side of the connector 15.

Figure 8:
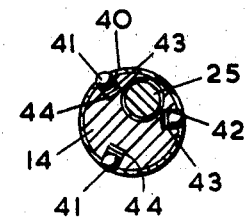
FIG. 8 is a sectional view taken on the line VIII—VIII in FIG. 5.

With reference now also to FIG. 8, around the body 14, above the slot 21, is a spring retaining ring 40 which holds three equaly-spaced balls 41 in position in radial holes 42 in the body 14. The balls 41 are urged outwards by elastic elements 43 which may for example be springs or resilient rings e.g. of rubber.

The purpose of the balls 41 is to provide radial support for the tool 10 in the hole through which it extends in a workpiece, e.g. the hole 13 in FIGS. 1 to 3, since holes requiring back spot facing are usually clearance holes for bolts, studs and so on, and therefore are not usually of a closely controlled diameter. The balls 41 are arranged so that they can project by an amount sufficient to allow them to remain in contact with the wall of the hole in the workpiece, despite any variations in the diameter of the hole.

Replaceable distance washers 44, of suitable thickness, may be provided behind the balls to provide initial accurate adjustment of the balls at equal radii from the axis of the tool body 14.

Figure 10:
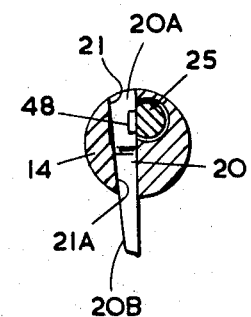
FIG. 10 is a sectional view, taken on the line X—X in FIG. 6 but showing the cutter in the same extended position as is shown in FIG. 9.
Figures 9, 11:
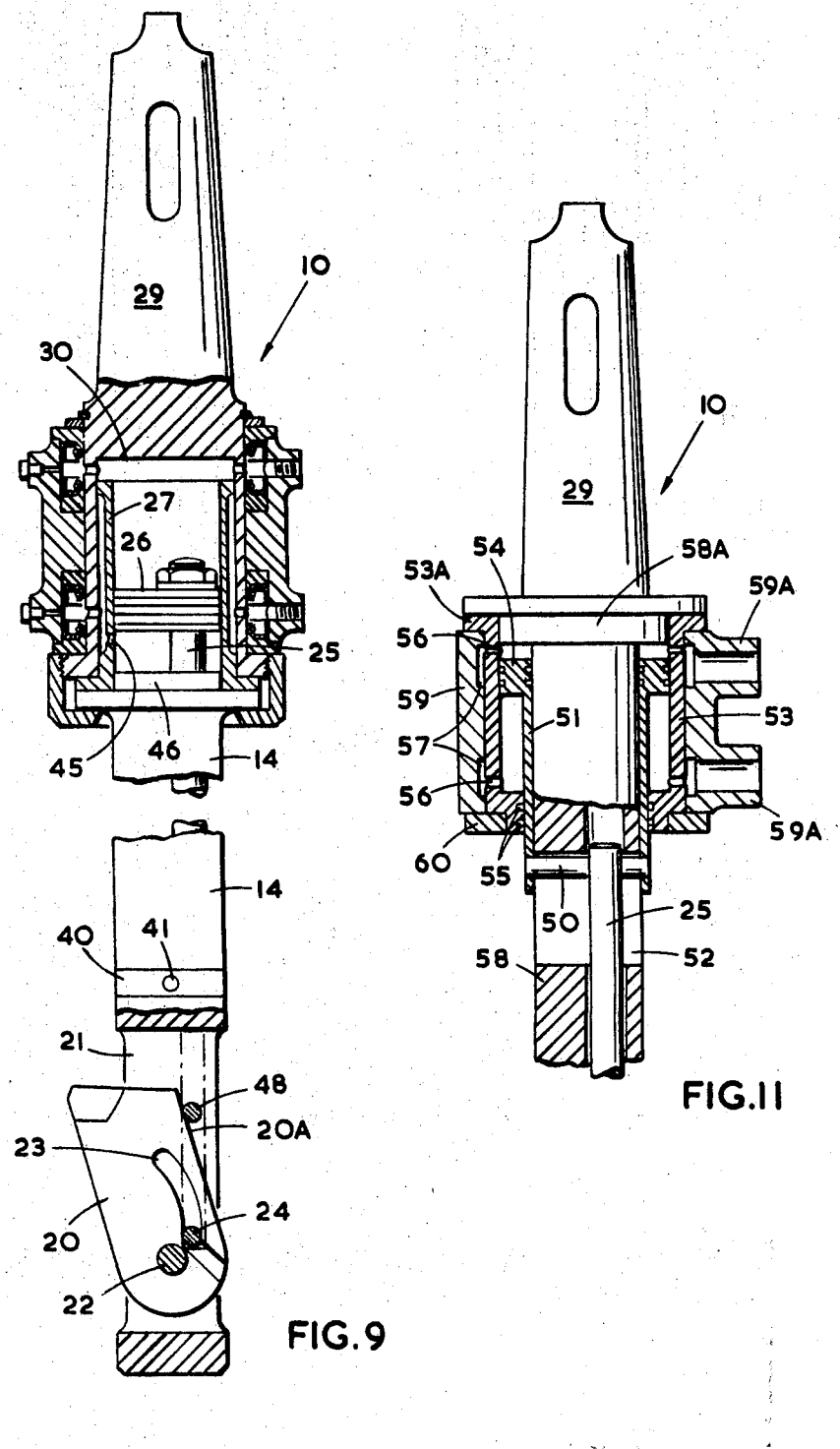
FIG. 9 is a part-sectional view corresponding to FIG. 4 but showing the same tool with the cutter in its extended position ready for cutting.
FIG. 11 is a part-sectional elevation showing a modified form of the upper part of the tool.

When the tool 10 is in the attitude shown in FIGS. 4 to 7, i.e. with the cutter 20 retracted, compressed air is admitted to the cylinder 27 above the piston 26, through the tube 16 (FIG. 1). This drives the piston 26 down relative to the tool body 14, so forcing the bar 25 down. The positions then assumed by the various components are shown in FIGS. 9 and 10. As the bar 25 moves down, the pin 24 acting on the cam groove 23, moves the cutter 20 outwards to its working position, As the bar 25 approaches the end of its stroke, a second pin 48 on the flat face 25A thereof is forced against the back edge 20A of the cutter 20, overriding the action of the pin 24 and giving a much more powerful thrust.

Air pressure above the piston 26 is maintained during cutting so exerting a continuous thrust on the cutter through the piston 26, bar 25 and pin 48 to keep the cutting in its working position.

As can be seen from FIGS. 5, 6, 7 and 10, one wall of the slot 21 is provided over part of its length with a tapered face 21A which makes this part of the slot narrowest at the outer end of the slot. The cutter 20 has a correspondingly tapered face 20B, so that as it is forced outwards to its working positions it becomes wedged against the tapered face 21A of the slot. The angle of the taper must be such as to avoid sticking.

Retraction of the cutter to the position shown in FIG. 4 is achieved by introducing compressed air below the piston 26, so raising the bar 25.

The control valve 18 (FIGS. 1 to 3) can be made for operation either manually or automatically.

The piston 26, cylinder 27 and associated parts may if desired be suitably modified for operation by a hydraulic fluid or other gas, instead of by compressed air.

FIG. 11 shows one alternative form of construction for the upper end of the tool. In this construction, the top end of the bar 25 is fixed, through a transverse pin 50, to a hollow cylindrical piston rod 51 which encircles the tool body shown at 58. The piston rod 51 is movable longitudinally on the tool body 58, which has a transverse slot 52 to permit the consequent movement of the pin 50. The slot 52, by preventing rotation of the pin 50 above the axis of the body 58, also prevents the bar 25 rotating with respect to the body.

The hydraulic cylinder is shown at 53, and is mounted on the body 58 through a stepped flange 58A at the upper end of the latter, above which is the shank 29, which in this case is fixed to or is integral with the body 58.

The piston rod 51 carries a piston 54 arranged for movement longitudinally in the cylinder 53: O-ring seals 55 are provided between the piston rod 51 and cylinder 53, the latter have ports 56 communicating at either side of the piston 54 with two annular grooves 57 in the connector, which is indicated at 59. The grooves 57 connect through connecting pieces 59A with the tubes 16 and 17 shown in FIGS. 1 to 3. The cylinder 53 has a flange 53A at its upper end, engaging the stepped flange 58A; the connector 59 is trapped between the flange 53A and a sealing ring 60 at the lower end of the cylinder 53, the mating surfaces of the connector 59, cylinder 53 and ring 60 being such as to permit relative rotation of the cylinder 53 and connector 59 while preventing undue escape of compressed air from the annular grooves 57 to each other or to the atmosphere.

It will be understood that many other variations on the construction described above are possible within the scope of the invention, for instance with regard to the offset or otherwise of the bar 25; and to the method of coupling the bar 25 to the cutter 20 (for example, the cutter may have a cam follower engaging a suitable cam track carried by the bar 25). The centering arrangment including the balls 41 may be replaced by any other suitable centering device. One arrangement which can be used with advantage is a pad of hard material, e.g. tungsten carbide.

The cutter may be provided with a cutting face for chamfering, as well as or instead of back spot facing, or for any other cutting operation which can be done by combined rotation and longitudinal movement of the tool operated from the other side of the workpiece through a hole therein.

In place of, or as well as, the balls 41, a suitable pilot may be used to locate the tool in the hole. This may be especially desirable where the hole is very large.

The diameter of the tool body is not critical: it should preferably be only slightly less than the smallest anticipated diameter of the hole through which it is to go, to avoid excessive radial projection of the cutter. It will of course be realised that the tool body need not be cylindrical, though if the balls 41 or a similar arrangement, or a pilot, are provided, the corresponding part of the body will have to be cylindrical.

Although the tool has been described herein, and shown in the drawings, as being arranged vertically with the cutter at the bottom end, it will be understood that it may be used in any attitude, since its operation is independent of gravity.

I claim:

1. A cutting tool for rotary cutting operations on the back face of a workpiece, including a tool body long enough to pass through an aperture in the workpiece, a cutter pivoted at one end of the body on a transverse axis, means for mounting the tool in a rotary machine tool at the other end of the body, a fluid-pressure operated actuating member in the body engaging the cutter and movable between a first position in which the cutter is retracted into the body and a fixed second position in which the actuating member holds the cutter extended laterally from the body for cutting the workpiece, and second cutter-engaging means positioned so as to engage the cutter in said second position whereby to transmit cutting forces between the tool body and the cutter through the actuating bar.

2. A cutting tool according to claim 1, wherein the actuating member is a longitudinally-extending bar having first cutter-engaging means engaging a cam surface of the cutter for moving it between said first and second positions.

3. A cutting tool according to claim 2, wherein said second cutter-engaging means is a lateral projection positioned to lie hard against a back edge surface of the cutter in said second position thereof.

4. A cutting tool according to claim 1, wherein the cutter has a tapered side surface, a corresponding tapered surface being formed internally of the body and positioned so that when the cutter is in said second position it is wedged in position by mutual engagement of the said tapered surfaces.

5. A cutting tool according to claim 1, wherein the actuating member is coupled to a piston arranged for longitudinal movement in a cylinder arranged at the end of the body remote from the cutter, in response to fluid pressure in the cylinder.

6. A cutting tool according to claim 5, wherein the actuating member is attached directly to the piston.

7. A cutting tool according to claim 5, wherein the actuating member is a bar extending longitudinally of the body and offset from the axis of the piston.

8. A cutting tool according to claim 1, including at least three balls arranged in a cylindrical external surface of the tool body and biassed radially outwards to engage the wall of the said aperture in the workpiece when the tool is in position for cutting the workpiece, when said aperture is a circular hole.

References Cited
UNITED STATES PATENTS

| | | | |
|---|---|---|---|
| 524,375 | 8/1894 | Blue | 77—58 |
| 2,515,810 | 7/1950 | Tornborg | 77—58 |
| 2,669,887 | 2/1954 | Rees | 77—2 |
| 2,991,670 | 7/1961 | Snell | 77—73.5 |
| 3,019,712 | 2/1962 | Winberry | 77—73.5 |
| 3,033,062 | 5/1962 | Carlstedt | 77—58 |
| 3,361,013 | 1/1968 | Vindez | 77—2 |
| 3,318,175 | 5/1967 | Cogsdill | 77—73.5 |
| 2,334,795 | 11/1943 | Smith | 77—58 |
| 3,304,597 | 2/1967 | Kezran | 77—73 |

GERALD A. DOST, Primary Examiner

U.S. Cl. X.R.

77—58